United States Patent Office 3,720,673
Patented Mar. 13, 1973

3,720,673
PROCESS FOR THE MANUFACTURE OF
QUINOXALINE 1,4-DIOXIDES
Raymond Alexander Bowie, Macclesfield, England, assignor to Imperial Chemical Industries Limited, London, England
No Drawing. Filed May 24, 1971, Ser. No. 146,528
Claims priority, application Great Britain, June 18, 1970, 29,626/70
Int. Cl. C07d 51/78
U.S. Cl. 260—250 R         10 Claims

ABSTRACT OF THE DISCLOSURE

A process for the manufacture of growth promoting quinoxaline-1,4-dioxide derivatives which comprises oxidising a quinoxaline derivative with hydrogen peroxide in the presence of a tungsten compound.

---

In our United Kingdom patent application No. 51,473/68 there are disclosed and claimed animal foodstuff compositions containing certain quinoxaline dioxide derivatives, and a method of promoting the growth of meat-producing domestic animals by the use of such foodstuffs. This present application relates to a process for the manufacture of such quinoxaline dioxide derivatives.

Thus, according to the invention, there is provided a process for the manufacture of a quinoxaline dioxide derivative of the formula:

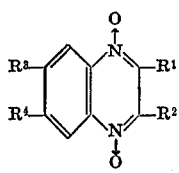

wherein, when $R^1$ and $R^2$ are hydrogen, $R^3$ is a hydrogen or halogen atom, or a methyl radical, and $R^4$ is a hydrogen atom or a methyl radical; or when $R^1$ and $R^2$ are methyl radicals, $R^3$ is a halogen atom and $R^4$ is a hydrogen atom, which comprises the reaction of a quinoxaline derivative of the formula:

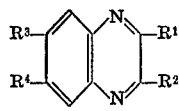

wherein $R^1$, $R^2$, $R^3$ and $R^4$ have the meanings stated above, with an aqueous solution of hydrogen peroxide in the presence of tungstic acid or a suitable salt thereof, pertungstic acid or a suitable salt or complex thereof, tungstic oxide or a tungsten compound capable of being oxidised by hydrogen peroxide to pertungstic acid.

The aqueous solution of hydrogen peroxide preferably contains between 10 and 70% by weight of hydrogen peroxide.

A suitable salt of tungstic acid is, for example, sodium tungstate, and a suitable salt or complex of pertungstic acid is, for example, the pyridine complex.

The tungsten compound may be present in the reaction to the extent of 0.0005 to 0.2 mole, and preferably 0.0005 to 0.02 mole, per mole of the quinoxaline derivative.

The process may be carried out either without a solvent other than the aqueous hydrogen peroxide solution used as a reactant, or in the presence of an additional diluent or solvent. Suitable additional solvents are, for example, water, glacial acetic acid, or alcohols, for example t-butanol.

The process may preferably be carried out at a temperature of between 50 and 100° C.

In carrying out the process of the invention, the quinoxaline, the tungsten compound and the hydrogen peroxide may be all mixed together and the mixture warmed to initiate the reaction, or alternatively the tungsten compound may be pre-oxidised by reaction with the hydrogen peroxide before the quinoxaline is added to the reaction mixture. In the latter case it is preferred to warm a mixture of the tungsten compound and hydrogen peroxide in a solvent, for example water, until the tungsten compound is dissolved, and to add the solution thus obtained slowly to a heated solution of the quinoxaline.

A preferred quinoxaline dioxide derivative which may be prepared by the process of the invention is quinoxaline 1,4-dioxide.

The invention is illustrated but not limited by the following examples:

EXAMPLE 1

A mixture of quinoxaline (13.0 g.), tungstic acid (2.5 g.) and t-butanol (30 ml.) was heated to 60–65° C., and an aqueous solution of hydrogen peroxide (30% w./v., 100 volumes, 30 ml.) was added during a few minutes. After 2½ hours, the mixture was cooled and evaporated to dryness under reduced pressure. The residue was extracted with boiling chloroform (800 ml.) and the hot extracts were filtered. The chloroform was evaporated and the residue was crystallised from 50% aqueous ethanol to give quinoxaline 1,4-dioxide, M.P. 245° C.

EXAMPLE 2

The process of Example 1 was repeated, except that after evaporation of the reaction mixture to dryness, the residue was stirred for 30 minutes with N sodium hydroxide (30 ml.). The solid was filtered off and stirred with a further 30 ml. of N sodium hydroxide, the mixture was filtered, and the filter cake was washed with water (60 ml.) to remove alkali. The solid was recrystallised from 50% aqueous ethanol to give quinoxaline 1,4-dioxide.

Similar results were obtained by using the process of Example 2, but (a) using 5 g. instead of 2.5 g. of tungstic acid
(b) using glacial acetic acid (30 ml.) instead of t-butanol
(c) using water (30 ml.) instead of t-butanol
(d) using no additional solvent
(e) using 0.5 g. instead of 2.5 g. of tungstic acid.

EXAMPLE 3

Using the process described in Example 1, but replacing quinoxaline by the appropriate substituted quinoxaline, the following substituted quinoxaline-1,4-dioxides were obtained:

6-chloro-7-methylquinoxaline-1,4-dioxide, M.P. 227° C.;
6,7-dimethylquinoxaline-1,4-dioxide, M.P. 220° C.;
6-methylquinoxaline-1,4-dioxide, M.P. 218–219° C.;
6 - chloro-2,3-dimethylquinoxaline-1,4-dioxide, M.P. 175–176° C., and
6 - bromo-2,3-dimethylquinoxaline-1,4-dioxide, M.P. 186–188° C.

EXAMPLE 4

A mixture of tungstic acid (2.5 g.) in t-butanol (20 ml.) was heated to 60–65° C. and an aqueous solution of hydrogen peroxide (30% w./v., 100 volumes, 30 ml.) was added dropwise. The mixture was maintained at 60–65° C. until a solution was obtained, and the solution was then added to a solution of quinoxaline (13 g.) in t-butanol (15 ml.) at 70° C. The reaction mixture was worked up as described in Example 1 to give quinoxaline-1,4-dioxide, M.P. 244–245° C.

What we claim is:

1. A process for the manufacture of a quinoxaline dioxide derivative of the formula:

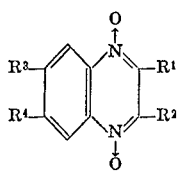

wherein $R^1$ and $R^2$ are hydrogen, $R^3$ is hydrogen, halogen or methyl, and $R^4$ is hydrogen or methyl; or $R^1$ and $R^2$ are methyl, $R^3$ is halogen and $R^4$ is hydrogen, which comprises the reaction of a quinoxaline derivative of the formula:

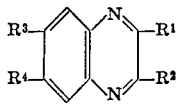

wherein $R^1$, $R^2$, $R^3$ and $R^4$ have the meanings stated above, with an aqueous solution of hydrogen peroxide in the presence of tungstic acid, pertungstic acid or, tungstic oxide.

2. A process as claimed in claim 1 wherein the tungsten compound is present in the reaction to the extent of 0.0005 to 0.2 mole per mole of the quinoxaline derivative.

3. A process as claimed in claim 1 which is carried out in the presence of an additional diluent or solvent.

4. A process as claimed in claim 3 wherein the additional diluent or solvent is water, glacial acetic acid or t-butanol.

5. A process as claimed in claim 1 which is carried out at a temperature of between 50 and 100° C.

6. A process as claimed in claim 1 wherein the quinoxaline, the tungsten compound and the hydrogen peroxide are all mixed together and the mixture warmed to initiate the reaction.

7. A process as claimed in claim 1 wherein the tungsten compound is pre-oxidised by reaction with the hydrogen peroxide before the quinoxaline is added to the reaction mixture.

8. A process as claimed in claim 7 wherein the pre-oxidation consists of warming a mixture of the tungsten compound and hydrogen peroxide in a solvent, and adding the solution thus obtained slowly to a heated solution of the quinoxaline.

9. A process as claimed in claim 1 wherein the quinoxaline dioxide derivative is quinoxaline-1,4-dioxide.

10. A process as claimed in claim 1 wherein the pertungstic acid is formed in situ.

References Cited

UNITED STATES PATENTS 2,626,259   1/1953   Landquist _____ 260—250 R
3,509,144   4/1970   Johnston _____ 260—250 R NICHOLAS S. RIZZO, Primary Examiner